United States Patent [19]

Cartier

[11] 4,126,601

[45] Nov. 21, 1978

[54] ABRASION RESISTANT COATING COMPOSITIONS

[75] Inventor: George E. Cartier, Springfield, Mass.

[73] Assignee: Monsanto Company, St. Louis, Mo.

[21] Appl. No.: 840,202

[22] Filed: Oct. 7, 1977

[51] Int. Cl.$^2$ ............................. C08K 3/34; C08K 5/54
[52] U.S. Cl. .................. 260/42.27; 260/42.26; 260/42.43; 260/827; 428/421; 428/422; 428/426; 428/911
[58] Field of Search ............... 428/911, 421, 422, 426, 428/428, 446; 260/42.27, 42.26, 42.43, 827

[56] References Cited

U.S. PATENT DOCUMENTS

| | | | |
|---|---|---|---|
| 3,390,203 | 6/1968 | Engelhardt | 260/827 |
| 3,392,130 | 7/1968 | Rucker et al. | 260/827 |
| 3,429,845 | 2/1969 | Bechtold et al. | 260/827 |
| 3,429,846 | 2/1969 | Bechtold et al. | 260/827 |
| 3,476,827 | 11/1969 | Engelhardt | 260/825 |
| 3,514,425 | 5/1970 | Engelhardt | 260/827 |
| 3,546,318 | 12/1970 | Vest | 260/42.26 |
| 3,718,516 | 2/1973 | Buckley et al. | 428/911 |
| 3,958,245 | 5/1976 | Cherenko et al. | 428/421 |
| 3,998,991 | 12/1976 | Kaas | 428/451 |
| 4,047,804 | 9/1977 | Stephens | 428/422 |

*Primary Examiner*—Ronald W. Griffin
*Attorney, Agent, or Firm*—D. Bennett; W. J. Farrington; J. C. Logomasini

[57] ABSTRACT

An abrasion resistant coating composition suitable for application to a substrate comprises a partially fluorinated polyvinyl acetal resin and polysilicic acid.

10 Claims, No Drawings

ABRASION RESISTANT COATING COMPOSITIONS

BACKGROUND OF THE INVENTION

This invention relates to abrasion resistant coatings and specifically to easily scratched substrates with an abrasion resistant coating deposited thereon.

For many purposes artificial polymers have been developed to take the roles traditionally filled by very durable materials such as glass and metal. In many ways the replacements are superior but frequently they have the drawback that they suffer far too readily from abrasion damage. For this reason much work has been done on making the polymers harder and tougher.

There is, however, an alternate approach that in some situations is preferred. This comprises the deposition of an abrasion resistant coating on the surface. The present invention falls into this latter category.

One such application which is becoming of increasing significance is in the field of optical laminates, that is transparent sheets comprising at least two layers of different materials and for the sake of clarity and brevity, this application is described in terms of that end use. It is obvious, however, that the coating compositions described herein can be used on other than laminates and on shaped articles such as bottles. All such uses are to be understood as being within the reasonable purview of this invention.

In certain applications, notably in car windshields, optical laminates comprising a thermoplastic sheet material between two sheets of glass are installed as standard equipment in many countries to comply with legislated safety standards. Such laminates have excellent strength and resistance to impact but do tend to be thicker and heavier than is desirable for this application especially when car weights are being cut to improve gas mileage. Moreover, the impact of an object on the surface of the inboard, that is the passenger side, surface of the windshield which is sufficient to splinter the glass layer is usually followed by a sliding downward movement along the fragments of splintered glass. Where the object making the impact is a human head, the resultant lacerations can be extremely unpleasant. It has, therefore, been proposed that the inboard glass layer be replaced by a lighter, thinner thermoplastic material that will not splinter to produce sharp cutting edges on impact.

Suitable replacement materials that have been proposed include polycarbonate, polyethylene terephthalate, polyurethane, cellulose aceto-butyrate, acrylates and styrene and acrylonitrile copolymers. Unfortunately, all of the suitable polymers so far described are much inferior to glass from the point of view of abrasion resistance so that in use the inboard surface is easily damaged by casual contact and even, in some cases, in normal cleaning operations.

One solution to this problem is to provide the inboard layer of thermoplastic material with an abrasion resistant coating. This is a subject that, in its broadest form, i.e., the provision of coatings for easily scratched thermoplastic materials has exercised inventive minds since the mid 1940s.

DISCUSSION OF THE PRIOR ART

U.S. Pat. No. 2,404,357 describes an abrasion resistant coating for polymethylmethacrylate comprising hydrolyzed ethyl silicate with a partially hydrolyzed vinyl acetate polymer in a proportion of 1 part by weight of the hydrolyzed polymer to 1-99 parts by weight of ethyl silicate calculated as $SiO_2$. Another patent describing a polymer coated with a resin-modified polysilicic acid in similar but less restricted terms is U.S. Pat. No. 2,404,426 which was derived from the same parent applications as was U.S. Pat. No. 3,404,357. U.S. Pat. No. 2,440,711 describes a two-layer coating comprising a first layer comprising hydrolyzed ethyl silicate and a polyvinyl butyral resin and a second layer comprising a hydrolyzed ethyl silicate and a 20-90 percent hydrolyzed vinyl acetate polymer. More recently, U.S. Pat. No. 3,652,379 describes a polycarbonate resin article with a three-layer abrasion resistant coating comprising a first layer of a hydroxylated polycarbonate resin, a second layer consisting essentially of silica and polyvinyl butyral and a third layer consisting essentially of silica and polyvinyl alcohol.

In U.S. Pat. No. 2,440,711 referred to above, the patentee specifically requires a low-hydroxyl polyvinyl butyral in the lower layer of his coating. He states that while relatively high hydroxyl polyvinyl butyrals such as those having up to about 28 percent of the polyvinyl alcohol groups unreacted with butyraldehyde, are useful in the base coat they are not so desirable as the low hydroxy resins such as those having less than about 10 percent of the polyvinyl alcohol groups unreacted because of the higher curing temperatures required to insure the resultant layer is not soluble in the second layer laid on top of it and because of the difficulty of preparing adherent composition with a high hydroxyl content.

It is noted that in U.S. Pat. No. 3,998,991 where a single coating similar to the second layer in U.S. Pat. No. 2,440,711 is described, a new ingredient in the form of a trimethoxy silane derivative is added to improve flexibility and adhesion to the polymeric substrate.

U.S. Pat. No. 3,476,827 describes a coating composition comprising polysilicic acid, an organic polymer which can be partially hydrolyzed polyvinyl acetal (a 20 percent hydroxylated polymer is described) or a hydrolyzed copolymer of tetrafluoroethylene and a vinyl ester and a block copolymer of a lower alkylene oxide with dimethyl siloxane (c.f. also U.S. Pat. No. 3,429,846).

The present invention provides an improved coating composition that has shown a greatly improved resistance to abrasion over the coatings of the prior art when applied to a substrate.

DESCRIPTION OF THE INVENTION

This invention comprises a coating composition suitable for application to a substrate which coating composition comprises a partially fluorinated polyvinyl acetal resin in which fluorine provides from 0.1 to 5 percent of the resin weight, and polysilicic acid in which the ratio by weight of polysilicic acid, calculated as $SiO_2$, to resin is from 1.5:1 to 5:1.

The invention further comprises a substrate, particularly a laminated glazing unit, provided with a coating having such a composition.

While not wishing to be bound by any theoretical explanation herein set forth, it is believed that when the fluorinated polyvinyl butyral resin is mixed with the polysilicic acid and heated to eliminate water, a reaction occurs between the acid and the hydroxyl groups in the polyvinyl butyral forming a crosslinked reaction product with great coherence and an abrasion resistance approaching that of silica alone. The presence of fluorine is believed to reduce the coefficient of friction of the coating and thereby increase its resistance to abrasive forces.

THE FLUORINATED POLYVINYL ACETYL

A conventional polyvinyl acetal is usually prepared by hydrolyzing a polyvinyl acetate to form a polyvinyl alcohol and then reacting the polyvinyl alcohol with a suitable aldehyde to form a polyvinyl acetal. However, in the absence of particularly stingent precautions, neither reaction goes to completion so that a commercial polyvinyl butyral, for example, may contain up to 3 percent by weight of acetate groups, calculated as polyvinyl acetate and from about 12 percent to about 25 percent by weight of hydroxyl groups, calculated as polyvinyl alcohol though it sometimes is advantageous to control the process to provide that the alcohol content, calculated on the same basis, be higher than this range for example up to 50 percent particularly from 35 to 50 percent. References to a percent hydroxyl content in what follows is to be understood as referring to a weight percentage of hydroxyl groups, calculated as polyvinyl alcohol, that is present in the polyvinyl acetal polymer.

Any convenient aldehyde such as formaldehyde, propionaldehyde, hexaldehyde, can be used to form the polyvinyl acetal but in practice, the most frequently used aldehyde is butyraldehyde.

The fluorinated polyvinyl acetal used in the present invention may be produced in an entirely analogous manner except that the hydrogen atoms of the aldehyde from which the acetal groups are formed are partially replaced by fluorine atoms to the extent necessary to provide that from 0.1 to 10 percent by weight of the fluorinated polyvinyl acetal is provided by fluorine atoms.

The replacement can be achieved either by replacing one or more of the hydrogen atoms of the aldehyde used to form the acetal group with fluorine atoms or by replacing some of the aldehyde with the corresponding fluorinated aldehydes or by a combination in which partially fluorinated aldehydes partially replace non-fluorinated aldehydes in the acetal-forming reaction. All such acetals are understood to be embraced by the term "fluorinated polyvinyl acetal."

In practice, the reaction of a fluorinated aldehyde with the adjacent hydroxyl groups pendant from the polymer chain is very much slower than that of the non-fluorinated aldehyde. It is found, however, that very good results are obtained when a fluorinated aldehyde is used together with the corresponding non-fluorinated aldehyde to produce a polyvinyl acetal containing from 0.1 to 5 and preferably 0.1 to 3 percent by weight of fluorine. A very convenient polyvinyl butyral is one in which from 1 to 5 percent of the butyral groups has been replaced by heptafluoro butyral groups.

In general, the fluorinated polyvinyl butyral resins most frequently employed have Staudinger molecular weights ranging from about 50,000 to 600,000 and preferably from 150,000 to 270,000 and may comprise, on a weight basis, anything from 10 to 45 percent hydroxyl groups, calculated as polyvinyl alcohol. Polyvinyl butyrals, prepared in a conventional way except for the incorporation of the fluorinated butyral groups, usually comprise about 10 to 25 percent hydroxyl groups calculated on this basis but a particularly useful group of polyvinyl butyrals comprise from 30 to 45 percent hydroxyl groups. The balance is conveniently made up from 0 to 3 percent ester groups (usually acetate groups), calculated as polyvinyl ester, and the rest substantially fluorinated and unfluorinated butyral.

The preferred amount of fluorinated polyvinyl acetal used in the composition of the present invention is in the ratio of one part by weight for each 1.5 to 5 parts by weight of polysilicic acid, calculated as $SiO_2$. This is found to be the range that combines greatest adhesion to the substrate with greatest abrasion resistance of the coating formed thereon. Within this range, however, from 2 to 4 parts of the polysilicic acid (calculated as above) for every part of the fluorinated polyvinyl acetal resin is especially preferred.

THE POLYSILICIC ACID

The polysilicic acid is conventionally provided by hydrolyzed tetraethyl orthosilicate. In theory, silicic acid comprises molecules formed of silicon atoms surrounded by four hydroxyl radicals but in practice there is invariably a degree of combination or condensation to form a macro-molecule referred to as polysilicic acid. When heated, more condensation occurs with the elimination of water to give a three dimensional silica structure with the majority of the silicon atoms bonded through oxygen atoms to four other silicon atoms. The degree of condensation that occurs can vary widely and for this reason it is convenient to calculate the amount of polysilicic acid on the basis of silica or $SiO_2$. It is understood that no matter what the original organic esterifying group may be, the hydrolysis product is the same.

As was indicated above, when the polysilicic acid reacts with the hydroxyl-containing fluorinated polyvinyl acetal resin in forming a coating on a substrate, the hydroxyl groups of the resin react with the acid to eliminate water and yield a crosslinked coating having a hard coherent structure.

When applied to a substrate, the coating composition of the present invention is conventionally in the form of a solution in a water/organic solvent mixture usually one containing up to 20 percent and preferably about 10 percent by weight of solids. The organic solvent is conveniently an alcohol, particularly methanol, ethanol, propanol, n-butanol or hexanol, though other water-miscible solvents which are not affected by or react with the acidic ingredients such as acetic acid, cyclohexanone or tetrahydrofuran could be used. The preferred solvent is an ethanol/acetic acid mixture.

After application, the composition is usually air dried and then cured by heating at a temperature sufficient to drive off the water eliminated during the condensation reaction. A convenient curing temperature is in the range of 105° to 160° C.

The coating compositions of the invention can be applied to a wide range of substrates such as glass, wood, melamine, phenol/formaldehyde resins, urea/formaldehyde resins, polyvinyl chloride, though it is usually most advantageous to apply it to a thermoplastic resin substrate such as polyvinyl butyral, polyurethanes, polycarbonates, polyethylene terephthalate, styrene and acrylonitrile copolymers, polymethylmethacrylate and cellulose aceto-butyrate.

The coating composition of the invention finds its most useful application in the provision of abrasion resistant coatings for laminated glazing units such as for example car windows and sunroofs, mirrors and glazing panels for architectural use. It can, however, be applied in other fields such as the coating of molded objects such as thermoplastic bottles, trays and other receptacles that are subject to a certain amount of abrasive contact at any stage between fabrication of the molded article and delivery of the receptacle to the customer.

The coating composition is conveniently laid down in the form of a wet layer from 0.025 mm to 0.5 mm and preferably from 0.04 mm to 0.16 mm in thickness though coatings of greater or lesser thicknesses may be appropriate for certain applications. The dry layer thickness can be anything from 2.5 microns upwards though coatings of from 2.5 to 20 and especially 5 to 10 microns are most preferred in practice.

SPECIFIC EMBODIMENTS

Specific examples of coating compositions according to the invention and the utility of such coatings in providing abrasion resistance to a variety of substrates are set out below. Comparison of the compositions of the invention with those of the prior art are also included.

It should be noted that the preparation of optical laminates using coating compositions comprising a hydroxyl-containing polyvinyl butyral is a process that is highly sensitive to the atmospheric dust and water vapor content at the time of preparation. Thus, unless the samples are produced under the same atmospheric conditions, the results obtained are not necessarily comparable.

Where Examples compare the coating compositions according to the invention with those containing polyvinyl butyrals outside the scope of the invention, it may be assumed that they were produced under comparable conditions.

In the following examples, the abrasion resistance of the coating specified is tested using a Taber Abraser according to the process set forth in U.S. Standard 26-1 (1966) Test No. 17, Method 7.15 except that the samples are tested after 100, 300, 600 and 1,000 cycles on the Abraser in place of the 100 cycles specified in the above Test. The method of calculating the "Haze" whether initial haze (Hi), final haze (Hf) or the haze after the specified number of cycles ($H_{100}$, $H_{200}$, $H_{600}$ and $H_{1000}$, respectively) is that described in the above test.

EXAMPLE 1

This Example illustrates a process by which a fluorinated polyvinylbutyral may be prepared.

A 1-liter flask equipped with a mechanical stirrer, condenser, thermometer and dropping funnel was charged with 125 grams of a polyvinyl alcohol cake obtained by hydrolysis of polyvinyl acetate using ethanol and washed with ethanol to remove the ethyl acetate by-product and centrifuged to remove most of the wash liquor. The charged polyvinyl alcohol cake contained 50.8 percent by weight total solids. In addition, 228 grams of 2B ethanol and 17 grams of water were charged into the flask which was then heated to 65° C. When the reaction mixture had reached this temperature, 37.5 grams of butyraldehyde and 15.8 grams of heptafluorobutyraldehyde were added as quickly as possible through the dropping funnel. Almost immediately an exotherm was observed followed shortly by gelling of the reaction mixture and after about 5 minutes, a break-up of the gel. After about 50 minutes, the reaction mixture was refluxed at 77° C. for about 3 hours.

The reaction was then terminated by addition of 300 ml of 2B ethanol. The polymeric product was separated and yielded 74 grams of a fluorinated polyvinylbutyral containing 25.7 percent of hydroxyl groups, calculated as polyvinyl alcohol, and 0.7 percent by weight of fluorine. The product had 3.2 percent by weight of fluorinated butyral groups and had a glass transition temperature of 46° C.

EXAMPLE 2

This Example describes the preparation of a fluorinated polyvinyl butyral.

The apparatus and reactants described in Example 1 were used to produce a fluorinated polyvinyl butyral with a smaller fluorine content.

In this Example, 32 grams of butyraldehyde and 33.1 grams of heptafluorobutyraldehyde were added to 125 grams of the polyvinyl alcohol (50.8 percent solids) in 228 grams of 2B ethanol and 17 grams of water.

The exotherm was again observed and the reaction mixture went through a gel phase before breaking up and refluxing.

The reaction was stopped after about 4 hours by addition of 500 ml of 2B ethanol and the polymer product (55 grams) was separated.

The polymer had a hydroxyl content, measured as polyvinyl alcohol, of 29.4 percent, a glass transition temperature of 47° C. and a fluorine content of 0.6 percent. It was found that 2.84 percent of the weight was provided by fluorinated butyral groups.

EXAMPLES 3 - 11

These Examples show the production of test samples in which the abrasion resistant coating was applied to a polyethylene terephthalate optical grade film. The fluorinated polyvinyl butyrals used were those produced in Examples 1 and 2.

A number of sample sheets of an optional grade polyethylene terephthalate (PET) were sprayed on one side with a 1 percent solution in toluene of Z-6020, a silane-based adhesion promoter available under that trade designation from Dow Corning Corporation. The samples were then dried at 80° C. for 10 minutes.

The fluorinated polymers were then filtered and after filtration, the fluorinated polymers were used to prepare the formulations set forth in Table I below. Those were then applied to the Z-6020 treated PET samples using 0.076 mm and 0.152 mm coating blades to apply wet coatings of about 0.04 to 0.05 mm and 0.08 to 0.1 mm respectively. The samples were then cured at 150° C. for 30 minutes.

The PET samples bearing the abrasion resistant coating were then treated on the uncoated side with the Z-6020 adhesion promoter previously described and heated at 80° C. for 10 minutes. After this, the treated side was laminated to a polyvinylbutyral sheet, which in turn was laminated to a glass sheet.

The glass/PVB/PET/Abrasion Resistant Coating laminate thus formed was subjected to the "Scotch Tape Adhesion test" in which a strip of Scotch Tape is applied to the coating and then removed. The test is passed if the coating does not separate from the PET substrate. This test is described in ASTM-D3359-74 ("Method for Measuring Adhesion by Tape Test"). In fact, all samples tested passed this test.

TABLE I
FORMULATIONS OF ABRASION RESISTANT COATINGS
(COMPOSITION AMOUNTS in grams)

| EXAMPLES | 7.5% Solution of Polymer of EXAMPLE 1 | 7.5% Solution of Polymer of EXAMPLE 2 | Silica (15% by wt.) | Ethanol/Acetic Acid (52:48) | Percent Total Solids | SiO$_2$/Polymer Ratio |
|---|---|---|---|---|---|---|
| 3 | 10 |    | 5    | 5    | 7.5 | 1:1 |
| 4 | 10 |    | 12.5 | 12.5 | 7.5 | 2.5:1 |
| 5 | 5  |    | 8.3  | 7.3  | 7.5 | 3.5:1 |
| 6 |    | 10 | 5    | 5    | 7.5 | 1:1 |
| 7 |    | 10 | 12.5 | 12.5 | 7.5 | 2.5:1 |
| 8 |    | 5  | 8.3  | 7.3  | 7.5 | 3.5:1 |

EXAMPLES 12 – 20

The Examples show the abrasion resistance of the samples prepared in Examples 3 – 8.

In each case the coating tested was applied using coating blades set at 0.076 mm and 0.152 mm. The instrument used was a Taber Abraser and the procedure is that set forth in U.S. Standard 26-1 (1966) Test No. 17 Method 7.15 except that the number of cycles on the Abraser was varied as shown. The method of calculating initial haze (Hi) and final haze (Hf) after completion of the stated number of cycles is to be found in the above procedure. The change in haze (dH) is obtained by subtracting Hi from Hf.

The results obtained which are averages of four separate evaluations are set forth in Table II.

TABLE II
ABRASION RESISTANCE - HAZE DEVELOPMENT

| EX. | SAMPLE TESTED FROM EXAMPLE | COATING-BLADE SETTING (mm) | INITIAL HAZE (Hi) | FINAL HAZE (Hf) after 300 Cycles | HAZE CHANGE (dH) |
|---|---|---|---|---|---|
| 9  | 3 | .076 | 1.057  | 8.514   | 7.457  |
| 10 | 3 | .152 | .743   | 10.298  | 9.555  |
| 11 | 4 | .076 | 1.067* | 3.239*  | 2.172  |
| 12 | 4 | .152 | 0.914  | 3.372   | 2.458  |
| 13 | 5 | .076 | 1.114  | 3.000   | 1.886  |
| 14 | 5 | .152 | 1.000  | 3.286   | 2.286  |
| 15 | 6 | .076 | 0.543  | 11.223  | 10.680 |
| 16 | 6 | .152 | 0.714  | 12.002  | 11.288 |
| 17 | 7 | .076 | 0.914  | 2.857   | 1.943  |
| 18 | 7 | .152 | 1.057  | 3.874   | 2.817  |
| 19 | 8 | .076 | 1.286  | 3.436   | 2.15   |
| 20 | 8 | .152 | 1.057  | 3.686   | 2.629  |

*average of 3 mms

From the above it can be seen that when the silica to polymer ratio is 1:1 (Examples 9, 10, 15 and 16) the amount of haze generated is much greater than when the ratio is either 2.5:1 or 3.5:1 and that generally the thinner coatings develop slightly less haze than the thicker.

The samples tested in Examples 13 and 19 were tested for abrasion resistance after higher numbers of cycles on the Taber Abraser and the results are set forth in Table III. As before, the figures given are averaged from four readings.

TABLE III

| | HAZE READING AFTER INDICATED CYCLES | | | | |
|---|---|---|---|---|---|
| EX. | 0 | 400 | 500 | 600 | 800 | 1000 |
| 13 | 1.114 | 3.600 | 4.488 | 5.460 | 6.915(5.907) | 9.403(8.727) |
| 19 | 1.286 | 3.943 | 5.115 | 5.745 | 9.373(7.200) | 13.973(10.323) |

The above results show a very gradual increase in haze at least up to 600 cycles. It is believed that the results at 800 and 1000 cycles are suspect since in each case the result is much influenced by one highly anomalous reading. If the best three readings are averaged for the 800 and 1000 cycles, for each, the figures given in parentheses are obtained. The corrected readings show a continuation of this same gradual trend but it should be noted that even after 800 cycles the haze values are less than those shown at 300 cycles when the ratio of silica to polymer was 1:1.

COMPARATIVE EXAMPLES A AND B

These Examples illustrate the abrasion resistance of a coating composition of the invention and compares it with one that does not comprise any fluorine.

The coating compositions were prepared in the same manner described above with respect to Examples 3 to 11 except that the polyvinyl butyral used comprised 21 percent by weight of hydroxyl groups, calculated as polyvinyl alcohol and, of course, no fluorine. Coating compositions comprising silica/polymer ratios of 3.5:1 and 2.5:1 were applied to an optical grade polyethylene terephthalate film sample using a coating blade with a gap set at 0.076 mm and then cured for 45 minutes at 150° C.

The coated samples were then abrasion tested using the same procedures described with reference to Examples 12 to 20. The results obtained are set forth in Table IV. The results of Examples 11, 13 17 and 19 are repeated in this Table to permit ready comparison.

TABLE IV
COMPARATIVE ABRASION RESISTANCE

| | SiO$_2$/Polymer Ratio | Initial Haze | Final Haze | Haze Change |
|---|---|---|---|---|
| Comp. Ex. A. | 2.5:1 | 1.34  | 3.26  | 1.92  |
| Example 11   | 2.5:1 | 1.067 | 3.239 | 2.172 |
| Example 17   | 2.5:1 | 0.914 | 2.857 | 1.943 |
| Comp. Ex. B  | 3.5:1 | 1.20  | 4.43  | 3.23  |
| Example 13   | 3.5:1 | 1.114 | 3.000 | 1.886 |
| Example 19   | 3.5:1 | 1.286 | 3.436 | 2.15  |

From the above Table IV, it can be seen that while at a ratio of 2.5:1 (silica/polymer) the results are very comparable, at a 3.5:1 ratio the improvement obtained by having fluorine present is very marked indeed.

The present invention also contemplates the use of conventional additives in the coating composition of the invention. These include adhesion promoters, flow agents, dyes, U.V. stabilizers, pigments, antioxidants and the like. It is evident from the foregoing that many changes and modifications can be made without departing from the essential spirit and scope of the present invention.

What is claimed is:

1. A coating composition suitable for application to a substrate which coating composition comprises a partially fluorinated polyvinyl acetal resin and polysilicic acid, in which the ratio by weight of polysilicic acid, calculated as $SiO_2$, to partially fluorinated polyvinyl acetal resin is from 1.5:1 to 5:1 and in which the partially fluorinated polyvinyl acetal contains from 0.1 to 10 percent by weight of fluorine.

2. The coating composition of claim 1 in which the partially fluorinated acetal contains from 0.1 to 3 percent by weight of fluorine.

3. The coating composition of claim 1 in which the polyvinyl acetal is polyvinyl butyral.

4. The coating composition of claim 1 in which the partially fluorinated polyvinyl acetal comprises acetal groups in which all the hydrogen atoms have been replaced by fluorine atoms.

5. The coating composition of claim 1 in which the $SiO_2$ partially fluorinated polyvinyl acetal resin weight ratio is from 2:1 to 4:1.

6. The coating composition of claim 1 in which the partially fluorinated polyvinyl acetal is a partially fluorinated polyvinyl butyral having a hydroxyl content, calculated as polyvinyl alcohol, of from 30 to 45 percent by weight.

7. A coating composition suitable for application to a substrate which coating composition comprises a partially fluorinated polvinyl butyral resin containing from 0.1 to 5 percent by weight of fluorine and polysilicic acid, in which the ratio by weight of polysilicic acid, calculated as $SiO_2$, to partially fluorinated polyvinyl acetal resin is from 2:1 to 4:1.

8. The coating composition of claim 7 in which the partially fluorinated polyvinyl butyral is a polyvinyl butyral in which from 1 to 5 percent of the butyral groups have been replaced by perfluorobutyral group.

9. A substrate coated with a coating composition according to claim 1.

10. A substrate coated with a coating composition according to claim 9.

* * * * *